(No Model.)
P. M. & D. T. SHARPLES.
CENTRIFUGAL BUTTER EXTRACTOR.
No. 497,416. Patented May 16, 1893.
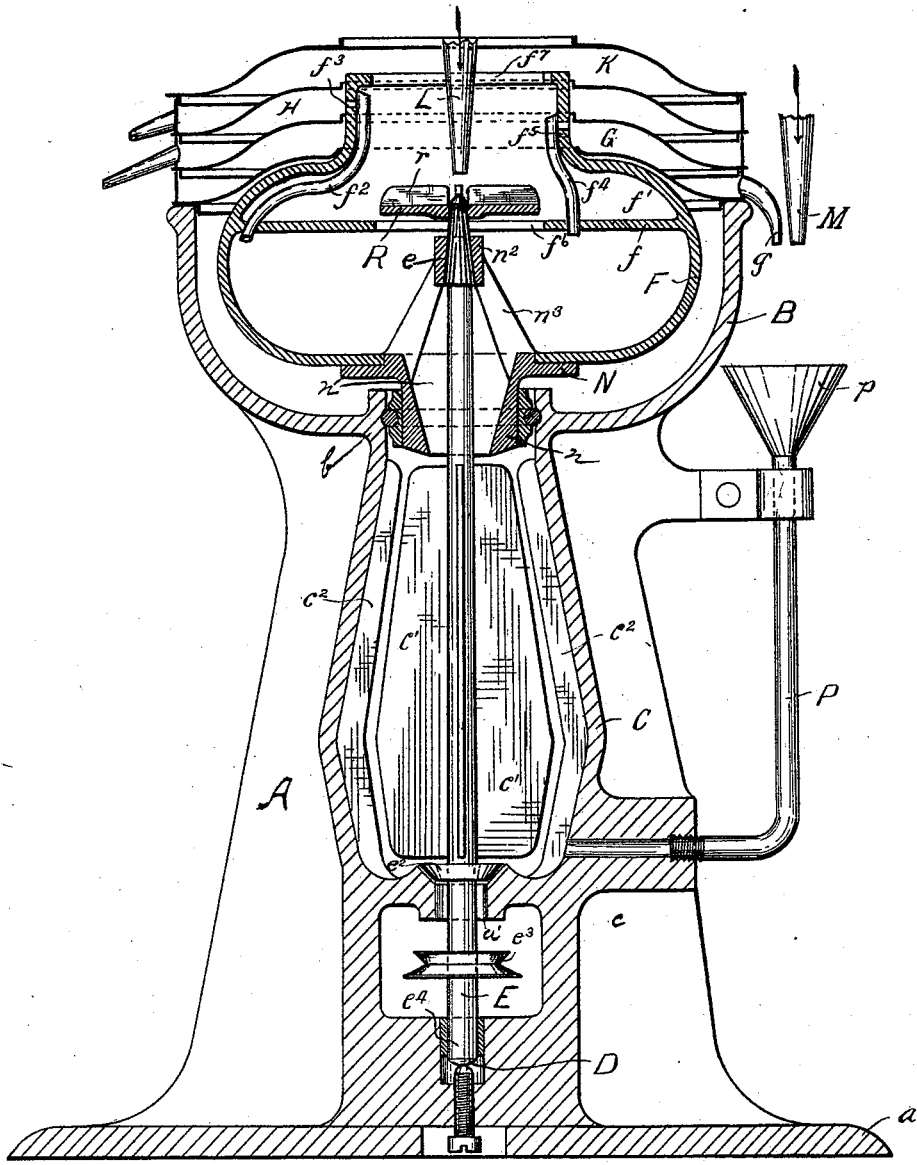
Witnesses
Ed. A. Kelly
David Levan
Philip M. Sharples
David T. Sharples
} Inventors
By their Attorney

UNITED STATES PATENT OFFICE.

PHILIP M. SHARPLES, OF WEST CHESTER, PENNSYLVANIA, AND DAVID T. SHARPLES, OF ELGIN, ILLINOIS.

CENTRIFUGAL BUTTER-EXTRACTOR.

SPECIFICATION forming part of Letters Patent No. 497,416, dated May 16, 1893.

Application filed July 17, 1890. Serial No. 359,075. (No model.)

*To all whom it may concern:*

Be it known that we, PHILIP M. SHARPLES, residing at West Chester, Chester county, Pennsylvania, and DAVID T. SHARPLES, residing at Elgin, in the county of Kane, State of Illinois, citizens of the United States, have invented certain Improvements in Processes of and Apparatus for Manufacturing Butter, of which the following is a specification.

Our invention relates mainly to an improved process of manufacturing butter.

The production of butter by churning the whole milk instead of first separating the cream therefrom and churning the latter only, is well known. In our complete process of manufacture there is a continuous automatic operation as follows:—First, the whole milk is supplied in a regulated stream, and is churned or agitated as it progresses from the inlet until butter in granular form is developed; second, the churned milk, as continuously delivered, is subjected to centrifugal action, whereby the constituent parts are separated into clearly defined bodies; third, the butter-fat while it is subjected to centrifugal action is thoroughly washed, thus removing all foreign matter; fourth the several constituents including the thoroughly "worked" butter, are continuously removed. The invention is more fully set forth in connection with the accompanying drawing and is specifically pointed out in the claims.

The drawing shows a sectional elevation of an apparatus embodying our invention.

The vertical frame A of the machine is supported on a base $a$, and is represented as formed with a churning barrel or chamber C and a casing B partially inclosing, in an ordinary manner, a centrifugal vessel F which is secured to the upper end of a spindle E, the depending portion of which spindle passes through the churning barrel and is supported in a suitable step bearing D; the shaft being rotated by any suitable means as a pulley $e^3$. The whole milk is admitted through an inlet $c$ and supply tube P to the lower end of the vertical churning barrel C. The spindle which forms the dasher axis of the churn passes through an opening $a'$ at the lower end of the churning barrel, a collar $e^2$ or other means being provided to prevent the downward escape of the milk from the barrel. The latter may be constructed in any suitable manner to effect the rapid churning of the milk as it progresses upward from the inlet $c$ to the funnel shaped opening $n'$ of the centrifugal vessel F, which dips into the upper end of the churn barrel; as represented the latter is simply provided with a series of vertical inwardly projecting ribs $c^2$ while dasher plates $c'$ are secured to the axis E and rotate within the barrel in such manner as to agitate the progressing milk and free the globules of butter-fat from their inclosing sack or bag by the time they reach the opening $n'$ of the centrifugal vessel. The base of the funnel shaped opening $n'$ is below the top $p$ of the supply tube P so that the level of the liquid in the barrel naturally rises to the opening as the supply is continuously kept up. As the liquid rises into the mouth of the opening it is rotated with the centrifugal vessel F and on account of the upwardly increasing diameter of the opening it is lifted by its centrifugal tendency into the main body of the vessel.

As already stated the milk during its passage through the barrel C is subjected to a churning action being repeatedly thrown by the dasher plates $c'$ against the fixed projections $c^2$ on the interior of the barrel thus developing the butter contained therein before it reaches the centrifugal vessel. The milk is not subjected to centrifugal action in the churning barrel but is merely agitated as in any ordinary churn, except that there is a continuous circulation through the barrel. The effect of this preliminary treatment is to greatly facilitate the subsequent separation of the constituent parts of the compound, the normal arrangement of which has been so unsettled thereby that the centrifugal vessel may be rotated at a much slower speed than is ordinarily required and yet a perfect separation be rapidly effected. As is well known the globules of butter vary in size and very great centrifugal force must be developed in the ordinary process to separate the smaller ones in the form of cream, from the blue milk, and at best a small proportion is always lost.

By our improved method of churning the whole milk before subjecting it to centrifugal action, every globule, however small, is sure to be subjected to the churning process; and though the amount of power required to churn the whole mass be greater than that required to churn the cream only, the apparent disadvantage is much more than overcome, first, by the saving of the small globules which ordinarily escape the necessary churning or agitating process, and second by the reduction of the power and of the excessive speed ordinarily required for the centrifugal vessel. The butter globules no longer having the heavier milk particles cohering,—as is the case with cream,—when the compound enters the centrifugal vessel it will evidently require comparatively little force to effect the separation of its constituents.

The skim milk will seek the outer wall, the butter globules will keep nearest the center of rotation, and just outside of the latter is likely to be a small proportion of imperfectly churned milk. The pipe $f^2$ with outlet $f^3$ permits the withdrawal of the skim milk in the usual manner into a receptacle H. A similar pipe $f^4$ with outlet $f^5$ conveys the unchurned milk to another receptacle G whence it drops through a nozzle $g$ into the supply tube P to be passed through the churn again with the continuous supply of new milk.

Instead of the butter fat being removed directly after its separation is effected, it rises through the central opening $f^6$ in the horizontal partition $f$, and is then subjected to the action of a continuous flow of water, which entering through a nozzle L, strikes a horizontal plate R secured to the top of the spindle E and provided with radiating flanges $r$, by means of which plate the water is quickly made to partake of the rotative movement of the vessel and is consequently thrown outward by centrifugal force into the butter-fat chamber $f'$ thus subjecting the butter-fat therein contained to the cleansing action of the water and at the same time floating it smoothly and easily over the open top $f^7$ of the vessel and delivering it, without in the least destroying the granular character of the butter, into a receptacle K.

In thus describing our invention the construction of the apparatus has not been fully explained in detail, the main object being to simply reveal clearly the novel features of our method or process, which may evidently be carried out by apparatus differing materially from that shown. The general construction of the latter however will be readily understood. The funnel shaped base N of the vessel F is connected by arms $n^3$ with the bearing $n^2$ by means of which it is secured to the upper end $e$ of the spindle E in such a manner as to permit the entry of the churned milk into the vessel. The lower cylindrical extension $n$ of this base piece is inclosed by the upper end $b$ of the churning barrel, thus providing a top bearing to steady the vessel, which bearing may be of any suitable construction. The lower end $e^4$ of the shaft, supported in a step bearing, sustains the main strain and wear.

It is important that the character and amount of churning should be just sufficient to develop the butter-fat without destroying its granular character as is very likely to be done in ordinary churning by continuing the operation a little longer than necessary. In our method the proportions of the parts and the speed of rotation and supply having been once regulated properly the operation goes on continuously with the assurance of producing a uniformly good grade of butter. By the use of water as described not only is the butter cleansed before removal, thus practically effecting continuous "working" and dispensing with that separate operation, but the removal is effected in a more satisfactory way than by scooping or any similar method which inevitably injures the quality of the output. There is no butter-fat wasted inasmuch as any that is not removed is automatically returned to the churn for a second passage.

What we claim is—

1. In a butter making apparatus a centrifugal vessel provided with a separating chamber and a butter-fat chamber communicating therewith, and having separate outlets from said chambers in combination with a fixed water nozzle L and a rotating receiver R, arranged to throw the water radially into said butter-fat chamber substantially as and for the purpose set forth.

2. The improvement in the art of manufacturing butter which consists first, in churning the whole milk while it is continuously progressing through the churning vessel; second, in continuously separating the constituent parts, third, in subjecting the butter-fat to the action of a jet of water and removing the same thereby, substantially as set forth.

3. In a butter making apparatus the combination with a churn of a centrifugal separating vessel communicating therewith and mounted on the dasher axis of the churn, substantially as and for the purpose set forth.

4. In a butter making apparatus the combination of a churn, a centrifugal separating vessel communicating therewith and mounted on the dasher axis of the churn, separate skim-milk, butter, and unchurned milk outlets from said vessel communicating with separate receptacles therefor, and a supply tube for said churn communicating also with said receptacle for unchurned milk, all substantially as set forth.

In testimony whereof we affix our signatures in presence of witnesses.

PHILIP M. SHARPLES.
DAVID T. SHARPLES.

Witnesses to the signature of Philip M. Sharples:
WM. S. WINDLE,
M. SHARPLES.

Witnesses to the signature of David T. Sharples:
CHAS. V. SPEED,
FRED. W. JENCKS.